(12) United States Patent
Hashimoto

(10) Patent No.: US 7,079,186 B2
(45) Date of Patent: Jul. 18, 2006

(54) DIAPHRAGM DEVICE OF A TELEVISION CAMERA LENS FOR A CCTV SURVEILLANCE CAMERA

(75) Inventor: Takaaki Hashimoto, Kanagawa (JP)

(73) Assignee: PENTAX Corporation, Tokyo (JP)

( * ) Notice: Subject to any disclaimer, the term of this patent is extended or adjusted under 35 U.S.C. 154(b) by 563 days.

(21) Appl. No.: 09/972,241

(22) Filed: Oct. 9, 2001

(65) Prior Publication Data

US 2002/0044212 A1 Apr. 18, 2002

(30) Foreign Application Priority Data

Oct. 13, 2000 (JP) .............................. 2000-313199

(51) Int. Cl.
*H04N 5/225* (2006.01)
*H04N 5/238* (2006.01)

(52) U.S. Cl. ...................................... 348/342; 348/363

(58) Field of Classification Search ........... 348/207.99, 348/335–342, 357–375, 360–366; 396/101, 396/276, 505–510, 241, 225
See application file for complete search history.

(56) References Cited

U.S. PATENT DOCUMENTS

| | | | | | |
|---|---|---|---|---|---|
| 4,047,807 A | * | 9/1977 | Okano et al. | ................ | 359/234 |
| 5,293,542 A | * | 3/1994 | Ise et al. | .................... | 348/363 |
| 5,689,746 A | * | 11/1997 | Akada et al. | ................ | 396/508 |
| 5,764,292 A | * | 6/1998 | Yamaguchi | .................. | 348/363 |
| 6,086,267 A | * | 7/2000 | Tsuzuki et al. | .............. | 396/459 |
| 6,091,900 A | * | 7/2000 | Kaneda et al. | ................ | 396/55 |
| 6,533,473 B1 | * | 3/2003 | Edamitsu et al. | ........... | 396/450 |
| 6,587,140 B1 | * | 7/2003 | No | .......................... | 348/207.2 |
| 6,771,315 B1 | * | 8/2004 | Nanjo et al. | ................ | 348/362 |
| 6,817,788 B1 | * | 11/2004 | Negishi et al. | ............. | 396/505 |
| 2002/0003583 A1 | * | 1/2002 | Arai | ........................... | 348/363 |
| 2004/0076423 A1 | * | 4/2004 | Inoue et al. | ................ | 396/505 |

FOREIGN PATENT DOCUMENTS

| JP | 02-123335 | * 5/1990 |
|---|---|---|
| JP | 2000-122109 | 11/1993 |
| JP | 5-292388 | 4/2000 |
| JP | 2000-310803 | * 11/2000 |

* cited by examiner

*Primary Examiner*—David Ometz
*Assistant Examiner*—Kelly Jerabek
(74) *Attorney, Agent, or Firm*—Greenblum & Bernstein, P.L.C.

(57) ABSTRACT

A diaphragm device of a lens for a CCTV camera includes a lens barrel, a diaphragm, a base plate which supports the diaphragm, a diaphragm driver for driving the diaphragm to adjust a size of an aperture formed by the diaphragm, an optical filter, and a filter driver for moving the optical filter into and out of an optical path of the lens; wherein each of the diaphragm and the optical filter lies on a corresponding surface of the base plate. The diaphragm, the base plate, the diaphragm driver, the optical filter, and the filter driver are provided in the lens barrel.

25 Claims, 9 Drawing Sheets

Prior Art

DIAPHRAGM DEVICE OF A TELEVISION CAMERA LENS FOR A CCTV SURVEILLANCE CAMERA

BACKGROUND OF THE INVENTION

1. Field of the Invention

The present invention relates to a diaphragm device of a television camera lens for a CCTV (closed-circuit television) camera, used as a surveillance camera, which incorporates an optical filter such as an infrared absorbing filter. The present invention also relates to a diaphragm device of a television camera lens for a CCTV camera, used as a surveillance camera, which is available in the range of a visible light region (approximately from 400 to 700 nanometers) to a near-infrared region (approximately 700 to 1000 nanometers).

2. Description of the Related Art

A CCTV surveillance camera in which an image of light in the visible light region is formed on a color CCD in a camera body to be indicated as a color image on a monitoring screen in the daytime, and in which an image of light in the near-infrared region excluding visible light is formed on the same color CCD to be indicated as a monochrome image on the monitoring screen at nighttime, is known in the art. In such a CCTV surveillance camera, a near-infrared absorbing filter is positioned in front of the CCD in the camera body or the lens barrel in an imaging operation during the daytime so that a color-image taking operation is performed for light only in the visible light region, and the near-infrared absorbing filter is retracted from the front of the CCD during an imaging operation at nighttime so that a monochromatic image-forming operation is performed for light in both the visible light region and the near-infrared region.

FIGS. 9A and 9B show fundamental elements of a conventional CCTV surveillance camera which incorporates an infrared absorbing filter. This CCTV surveillance camera is provided with a camera body 10' and a lens barrel 18' fixed to the front of the camera body 10'. The camera body 10' is provided therein with an infrared absorbing filter 22'. FIG. 9A shows a state where the infrared absorbing filter 22' is positioned in front of a CCD 11 on an optical axis L of a television camera lens, while FIG. 9B shows a state where the infrared absorbing filter 22' is retracted from the front of the CCD 11 on the optical axis L. The incident light on the lens barrel 18' enters the camera body 10' to be incident on the CCD 11 via the infrared absorbing filter 22' to be indicated as an image on a monitoring screen (not shown) in the state shown in FIG. 9A, and the incident light on the lens barrel 18' enters the camera body 10' to be incident on the CCD 11 without passing through the infrared absorbing filter 22' to be indicated as an image on the monitoring screen in the state shown in FIG. 9B. An actuator such as a galvanometer type actuator 24 drives a diaphragm device 21' provided in the lens barrel 18' to adjust the size of the aperture of the diaphragm device 21'. On the other hand, the infrared absorbing filter 22' is driven by another actuator 25' such as a motor provided in the camera body 10' to be inserted into and retracted from an optical path in front of the CCD 11 on the optical axis L as shown in FIGS. 9A and 9B, respectively.

However, since the camera body of the CCTV surveillance camera, whose camera body and lens barrel are formed integral with each other, is generally small, it is difficult to incorporate a drive unit for the near-infrared absorbing filter into the small camera body.

A conventional diaphragm device in which an ND filter is adhered to a diaphragm blade to be positioned on the aperture formed by the diaphragm for the purpose of extending the range of control of the light quantity during an imaging operation at nighttime, i.e., during the time when the infrared absorbing filter 22' is retracted from the front of the CCD, is known in the art. However, the transmittance of a conventional ND filter for infrared light is generally high. FIG. 10 shows the spectral characteristics of a conventional ND filter by way of example. During monochromatic image-forming, this type of ND filter cannot adequately control all the quantity of the incident light including visible light and infrared light, and the transmittance for infrared light becomes greater than that for visible light. As a result, a portion of an object which has a high reflectivity for infrared light appears so bright that an image of the portion is difficult to be seen on a monitoring screen.

SUMMARY OF THE INVENTION

An object of the present invention is to provide a small and compact diaphragm device for a television camera lens of a CCTV surveillance camera. Another object of the present invention is to provide a diaphragm device for a television camera lens of a CCTV surveillance camera, wherein not only the quantity of visible light reaching an image pick-up device of the television camera but also the quantity of infrared light reaching the same image pick-up device can be controlled adequately during an imaging operation at nighttime. Other aspects and objects of the present invention will become apparent to one skilled in the art by reading the following disclosures and the appended claims.

To achieve the above-mentioned objects, according to an aspect of the present invention, a diaphragm device of a lens for a CCTV camera is provided, including a lens barrel, a diaphragm, a base plate which supports the diaphragm, a diaphragm driver for driving the diaphragm to adjust a size of an aperture formed by the diaphragm, an optical filter, and a filter driver for moving the optical filter into and out of an optical path of the lens; wherein each of the diaphragm and the optical filter lies on a corresponding surface of the base plate. The diaphragm, the base plate, the diaphragm driver, the optical filter, and the filter driver are provided in the lens barrel.

Preferably, the diaphragm device further includes a filter supporting plate having two apertures, the optical filter being fixed to the filter supporting plate so as to cover at least one of the two apertures. The diaphragm includes a pair of blades which overlap each other, the pair of blades lie on a first surface of the base plate, the filter supporting plate lies on a second surface of the base plate, and the filter driver moves the filter supporting plate so that the two apertures are selectively positioned in the optical path.

In an embodiment, the filter driver includes a lock mechanism which locks the optical filter at an advanced position and a retracted position when the filter driver moves the optical filter into and out of the optical path, respectively.

In an embodiment, the filter driver includes a latch mechanism which positions the filter supporting plate at an advanced position and a retracted position when the filter driver moves the optical filter into and out of the optical path, respectively.

Preferably, the optical filter is an infrared absorbing filter which absorbs light in an infrared region.

Preferably, the diaphragm device further includes at least one second optical filter which is fixed to at least one of the pair of blades so as to cover the aperture formed by the pair of blades of the diaphragm.

In an embodiment, each of the at least one second optical filter is an ND filter.

In an embodiment, the ND filter includes spectral transmittance characteristics wherein a transmittance of the ND filter for light in an infrared region is substantially identical to or less than a transmittance of the ND filter for visible light.

In an embodiment, the ND filter includes spectral transmittance characteristics so as to filter out light in an infrared region.

Preferably, the infrared region ranges from approximately 700 to 1000 nanometers.

Preferably, a surface of the ND filter has a reflectivity which is equal to or less than approximately two percent.

Preferably, the ND filter is made of a resin base on which multi-metal layers are formed by evaporating a metal onto the resin base.

According to another aspect of the present invention, a diaphragm unit is provided in a lens barrel of a CCTV surveillance camera, the diaphragm unit including a base plate having a plane portion on which an image-forming aperture is formed; a filter supporting plate which is held by one of front and rear surfaces of the base plate to be movably guided on and along the one of the front and rear surfaces, the filter supporting plate having two apertures which are selectively positioned to align with the image-forming aperture; an infrared absorbing filter fixed to the filter supporting plate so as to cover one of the two apertures; a pair of diaphragm blades which slidably overlap each other and are held by the other of the front and rear surfaces of the base plate, wherein a variable-sized aperture is formed by the pair of diaphragm blades, the size of the variable-size aperture changing in accordance with relative movement between the pair of diaphragm blades; at least one ND filter which is fixed to at least one of the pair of diaphragm blades so as to cover the image-taking aperture; and first and second actuators fixed to the base plate on opposite sides of the plane portion of the base plate, respectively. The first actuator moves the pair of diaphragm blades in opposite directions relative to each other to adjust the size of the variable-sized aperture. The second actuator moves the filter supporting plate so that the two apertures are selectively positioned to align with the image-forming aperture.

In an embodiment, the ND filter includes spectral transmittance characteristics wherein a transmittance of the ND filter for light in an infrared region is substantially identical to or less than a transmittance of the ND filter for visible light.

In an embodiment, the ND filter includes spectral transmittance characteristics so as to filter out light in an infrared region.

Preferably, the diaphragm unit further includes a plane-parallel plate which is fixed to the filter supporting plate so as to cover the other of the two apertures, wherein the second actuator moves the filter supporting plate so that the infrared absorbing filter is positioned in front of a color image pick-up device of the CCTV surveillance camera during an image-forming operation in the daytime, and so that the plane-parallel plate is positioned in front of the color-image pick-up device of the CCTV surveillance camera during an image-forming operation at nighttime.

Preferably, the diaphragm unit further includes a latch mechanism which positions the filter supporting plate in each of first and second positions. One of the two apertures is positioned to align with the image-forming aperture when the filter supporting plate is positioned in the first position, and the other of the two apertures is positioned to align with the image-forming aperture when the filter supporting plate is positioned in the second position.

Preferably, the infrared region ranges from approximately 700 to 1000 nanometers.

Preferably, a surface of the ND filter has a reflectivity which is equal to or less than approximately two percent.

Preferably, the ND filter is made of a resin base on which multi-metal layers are formed by evaporating a metal onto the resin base.

Preferably, the lens barrel is integrally fixed to a camera body of the CCTV surveillance camera.

Preferably, the base plate includes a plurality of supporting protrusions which are formed on each of front an rear surface thereof to support and guide each of the diaphragm and the filter supporting plate in a longitudinal direction of the base plate.

Preferably, the diaphragm driver is a galvanometer type actuator.

Preferably, the filter driver is a galvanometer type actuator.

According to another aspect of the present invention, a diaphragm device is provided, including a plurality of diaphragm blades which slidably overlap each other to form a variable-sized aperture; a filter supporting plate having an infrared absorbing filter; a base plate which supports the plurality of diaphragm blades and the filter supporting plate on opposite surfaces of the base plate, respectively; a first driver for moving the plurality of diaphragm blades on the base plate to adjust a size of the variable-sized aperture; and a second driver for moving the filter supporting plate on the base plate so that the infrared absorbing filter is selectively inserted into and retracted from an optical path in the lens barrel. The first driver and the second driver are positioned in opposite sides of the base plate.

The present disclosure relates to subject matter contained in Japanese Patent Application No. 2000-313199 (filed on Oct. 13, 2000) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1A:
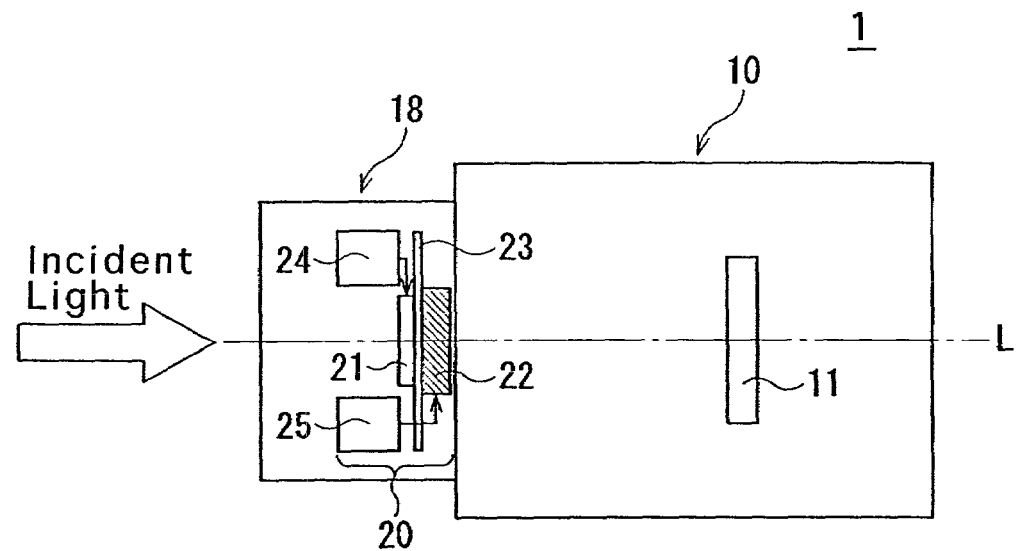
FIG. 1A is a schematic diagram of a television camera for a CCTV surveillance camera which incorporates an embodiment of a diaphragm device according to the present invention, showing only fundamental elements of the television camera in a state where an infrared absorbing filter is inserted into an optical path.
Figure 1B:
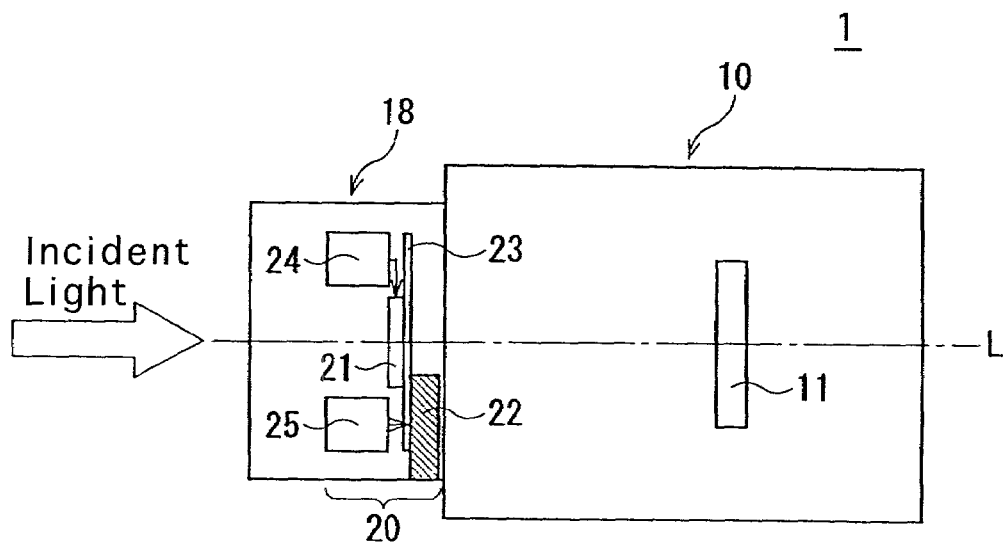
FIG. 1B is a view similar to that of FIG. 1A and shows the fundamental elements of the television camera shown in FIG. 1A in another state where the infrared absorbing filter is retracted from the optical path.

FIGS. 1A and 1B show a CCTV surveillance camera 1 which incorporates an embodiment of a diaphragm device to which the present invention is applied. FIG. 1A shows a state of a CCTV surveillance camera 1 where an infrared absorbing filter (optical filter) 22 is inserted into an optical path so as to lie on a television camera lens optical axis L, while FIG. 1B shows another state of the CCTV surveillance camera 1 where the infrared absorbing filter 22 is retracted from the optical path so as not to lie on the television camera lens optical axis L.

The CCTV surveillance camera 1 includes a camera body 10 and a lens barrel 18 which is integrally fixed with the front of the camera body 10. The camera body 10 is provided therein with a CCD 11 which serves as an image pick-up device. The lens barrel 18 is provided therein with television camera lens elements (not shown) and a diaphragm unit (diaphragm device) 20. The diaphragm unit 20 is provided with a diaphragm 21, an infrared absorbing filter 22, a base plate 23, a first galvanometer type actuator (actuator/diaphragm driver) 24 used for driving the diaphragm 21, and a second galvanometer type actuator (actuator/filter driver) 25 used for driving the infrared absorbing filter 22.

In FIG. 1A, light reflected by an object is incident on an objective lens (not shown) of the lens barrel 18 to be formed as an image on a sensitive surface of the CCD 11 via the diaphragm 21 and the infrared absorbing filter 22. In the state shown in FIG. 1A, since the infrared absorbing filter 22 does not allow the infrared portion of the incident light to pass therethrough, only light in the visible light region is formed as an image on the CCD 11. This image is picked up as a color image.

On the other hand, since the infrared absorbing filter 22 is retracted from the optical axis L by the second galvanometer type actuator 25 in FIG. 1B, the incident light on the objective lens of the lens barrel 18 is formed as an image on the CCD 11 via only the diaphragm 21. Accordingly, not only light in the visible light region but also light in the infrared region are incident on the CCD 11 to be formed as an image thereon. This image is picked up as a monochrome image. The base plate 23 of the diaphragm unit 20 is provided thereon with a circular aperture (image-forming aperture) 51 (see FIGS. 4A and 4B) the diameter of which is sufficiently large for the incident light on the objective lens of the lens barrel 18 to pass through. The incident light on the objective lens of the lens barrel 18 reaches the sensitive surface of the CCD 11 via the circular aperture 51.

Figure 2A:
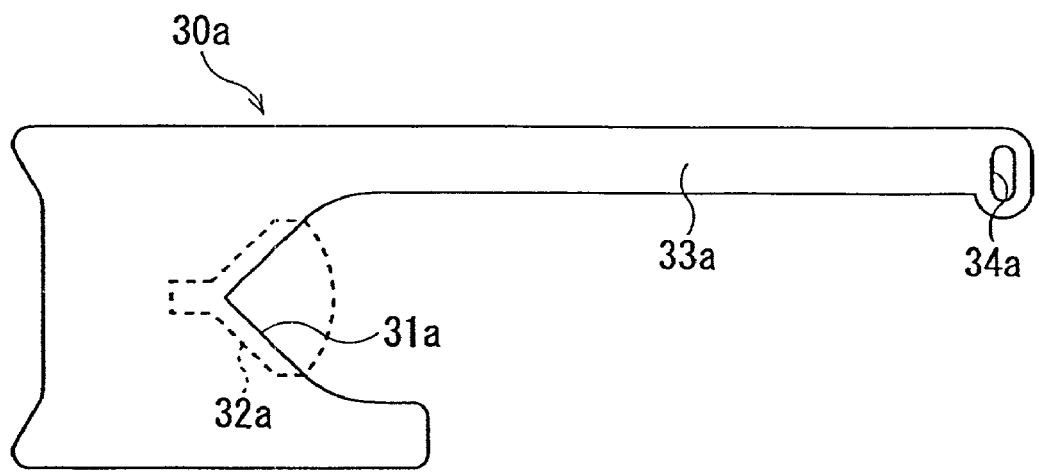
FIG. 2A is a plan view of one of a pair of blades of the diaphragm device shown in FIGS. 1A and 1B.
Figure 2B:
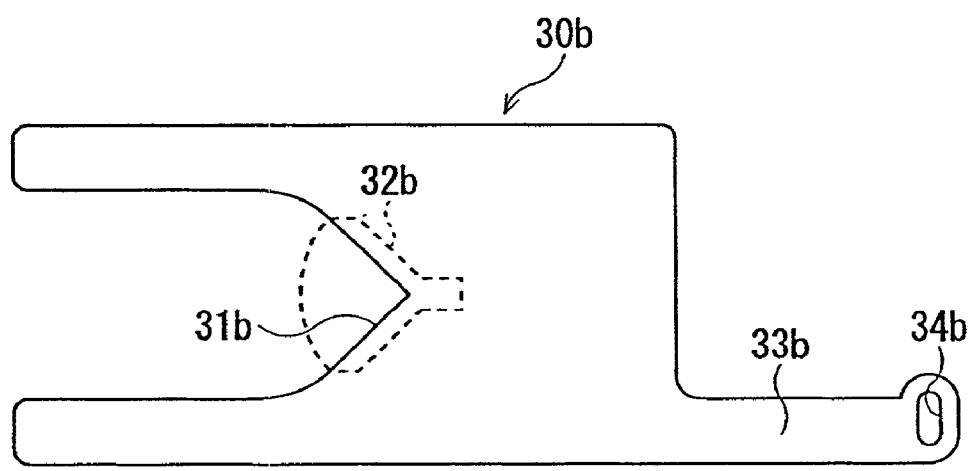
FIG. 2B is a plan view of the other blade of the diaphragm device shown in FIGS. 1A and 1B.

The diaphragm 21 is of a conventional type, consisting of a pair of blades (first and second blades) 30a and 30b. Each of the blades 30a and 30b is made of a thin metal plate. As can be seen in FIGS. 2A and 2B, the shapes of the blades 30a and 30b are different from each other. The pair of blades 30a and 30b overlap each other to form an aperture (variable-sized aperture), the size of which varies by moving the pair of blades 30a and 30b relative to each other along the base plate 23.

As shown in FIGS. 2A and 2B, the first and second blades 30a and 30b are provided with substantially V-shaped portions 31a and 31b, respectively. Two ND filters 32a and 32b (shown by broken lines in FIGS. 2A and 2B) each having a substantially sector shape are adhered to the first and second blades 30a and 30b by an adhesive to cover the V-shaped portions 31a and 31b, respectively. Although an ND filter (32a or 32b) is fixed to each of the pair of blades 30a and 30b in the present embodiment, it is possible for only one of the pair of ND filters 32a or 32b to be fixed to the corresponding one of the pair of blades 30a or 30b. The first and second blades 30a and 30b are provided with drive arms 33a and 33b, respectively, which extend rightwards as viewed in FIGS. 2A and 2B in a direction of movement of the first and second blades 30a and 30b. The first and second blades 30a and 30b are driven by the first galvanometer type actuator 24 via the drive arms 33a and 33b, respectively. The tips of the drive arms 33a and 33b are provided with slots 34a and 34b in which engaging pins 24d and 24e (see FIGS. 6 and 7) of the first galvanometer type actuator 24 are engaged, respectively.

Figure 3A:
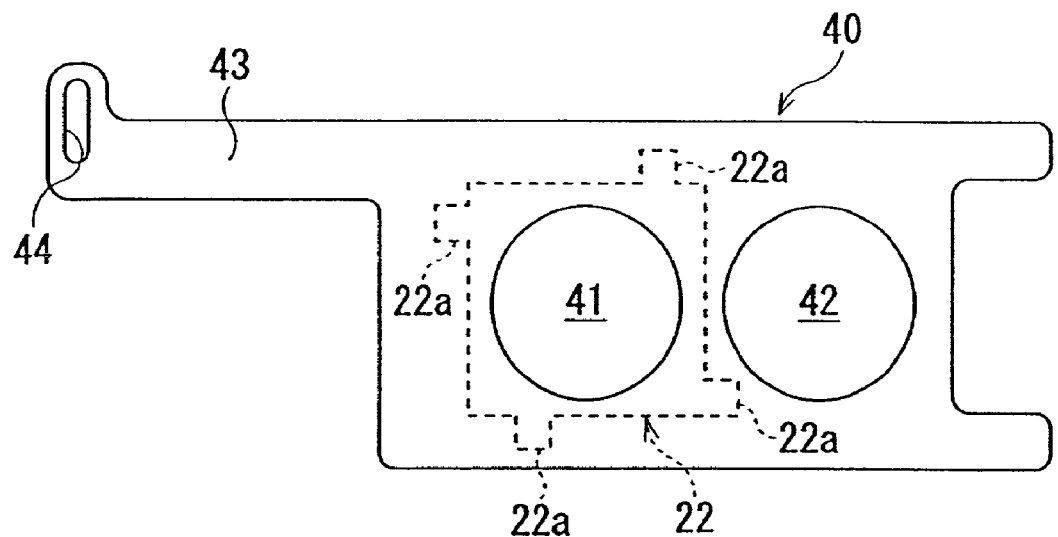
FIG. 3A is a plan view of a filter supporting plate to which an infrared absorbing filter is fixed.
Figure 3B:
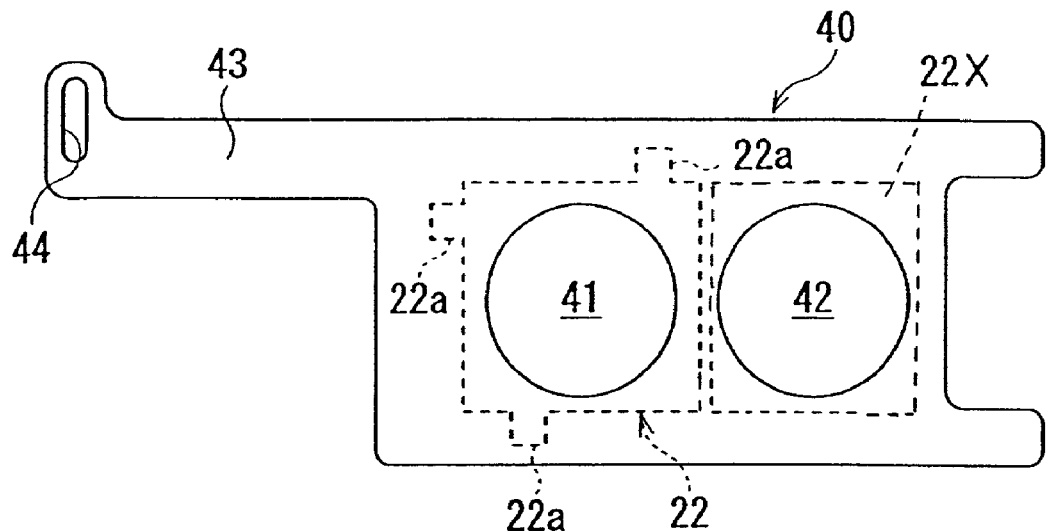
FIG. 3B is a plan view of a filter supporting plate to which an infrared absorbing filter and a plan-parallel plate are fixed.

FIGS. 3A and 3B are plan views of a filter supporting plate 40 to which the infrared absorbing filter 22 is fixed.

The filter supporting plate 40 is made of a thin metal plate, and is provided with a drive arm 43 which extends leftwards as viewed in FIGS. 3A and 3B. The filter supporting plate 40 is provided along a longitudinal direction (the horizontal direction as shown in FIGS. 3A and 3B) thereof with two circular apertures (first and second circular apertures) 41 and 42 having the same size. In the embodiment shown in FIG. 3A, the aperture 42 is a simple through-hole having nothing adhered thereto. The infrared absorbing filter 22 (shown by a broken line in FIG. 3A) is fixed to the filter supporting plate 40 so as to fully cover the first circular aperture 41. The infrared absorbing filter 22 is provided on each of the four sides thereof with a protrusion 22a. These four protrusions 22a can be adhered to the filter supporting plate 40 by an adhesive to fix the infrared absorbing filter 22 to the filter supporting plate 40.

The tip of the drive arm 43 is provided with a slot 44 in which an engaging pin 25d (see FIGS. 6 and 7) of the second galvanometer type actuator 25 is engaged. The diameter of each of the first and second circular apertures 41 and 42 is substantially identical to that of the above described circular aperture 51 (see FIGS. 4A and 4B), and corresponds to the maximum aperture (maximum image-forming aperture) of the diaphragm unit 20.

Figure 8:
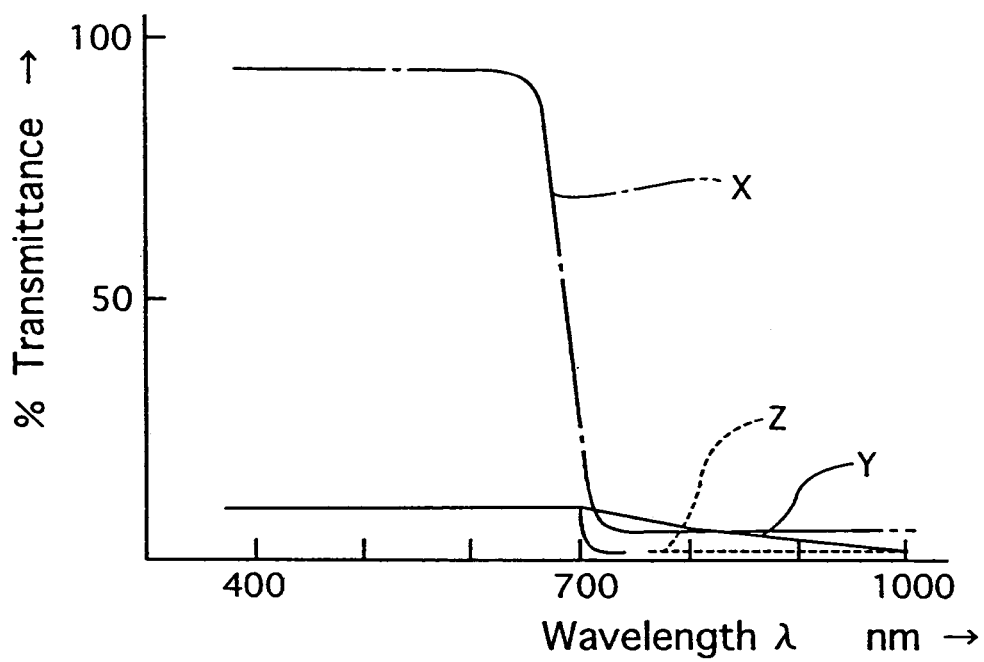
FIG. 8 is a graph of the spectral transmittance characteristics of an infrared absorbing filter and an ND filter, by way of example, which are used for a diaphragm device according to the present invention.
Figure 10:
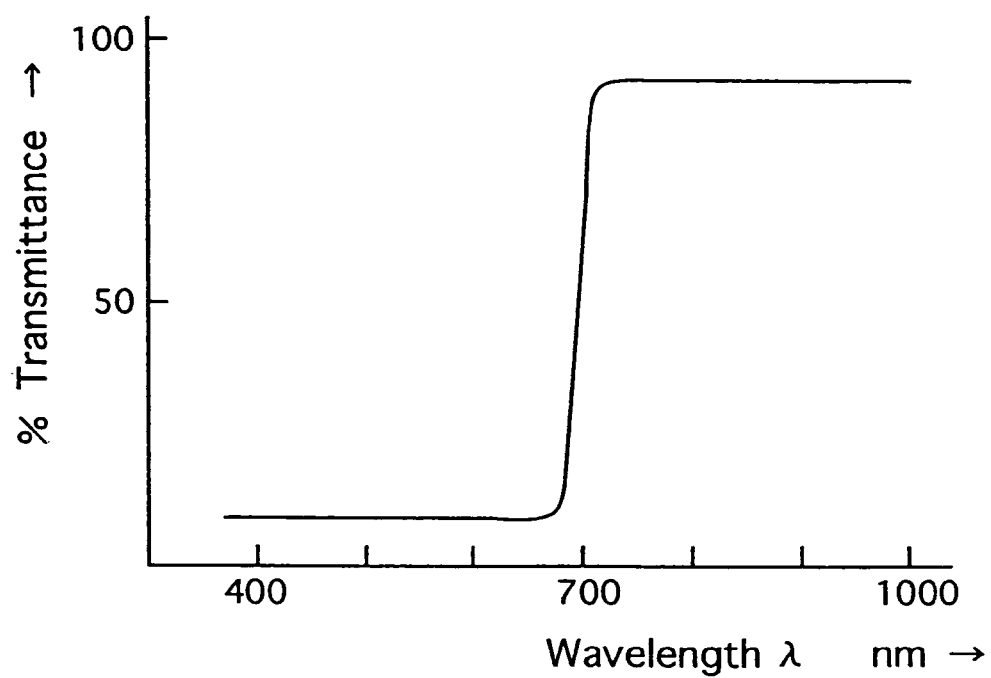
FIG. 10 is a graph of the spectral transmittance characteristics of a conventional typical ND filter.

The infrared absorbing filter 22 has, e.g., spectral transmittance characteristics indicated by a one-dot chain line X in FIG. 8 to filter out light wavelengths from above approximately 700 nanometers. More specifically, the infrared absorbing filter 22 has the transmittance of approximately equal to or less than five percent for light wavelengths in the range of approximately 700 to 1000 nanometers (i.e., in the range extending over the visible light region and the near-infrared region). The infrared absorbing filter 22 is made of, e.g., an evaporated multi-layered interference filter.

On the other hand, each of the ND filters 32a and 32b has, e.g., spectral transmittance characteristics (indicated by a solid line Y in FIG. 8) such that the transmittance of each ND filter for infrared light is substantially identical to or less than that for visible light. Each of the ND filters 32a and 32b is made of, e.g., a resin base on which multi-metal layers are formed by evaporating a metal onto the resin base. With the ND filters 32a and 32b having such spectral transmittance characteristics indicated by the solid line Y in FIG. 8, the amount of light transmission can be controlled without deteriorating the chromatic characteristics of a color image during color image-forming in the daytime, while the amount of light transmission can be controlled by increasing F-number to a sufficient degree relative to the infrared region that is sensed by the CCD 11 during monochromatic image-forming at nighttime.

Each of the ND filters 32a and 32b can have spectral transmittance characteristics indicated by a broken line Z instead of the solid line Y in FIG. 8 to filter out infrared light almost completely. If a monochromatic image is taken with the ND filters 32a and 32b positioned on the optical axis L, an infrared photography phenomenon does not occur in which a portion of an object which has a high reflectivity for infrared light appears too bright.

It is preferable that a surface of each of the ND filters 32a and 32b has a reflectivity equal to or less than approximately two percent, to prevent a ghost image or a flare spot from being formed.

The diaphragm unit 20 will be hereinafter discussed in detail with reference to FIGS. 4A through 7.

Figure 4A:
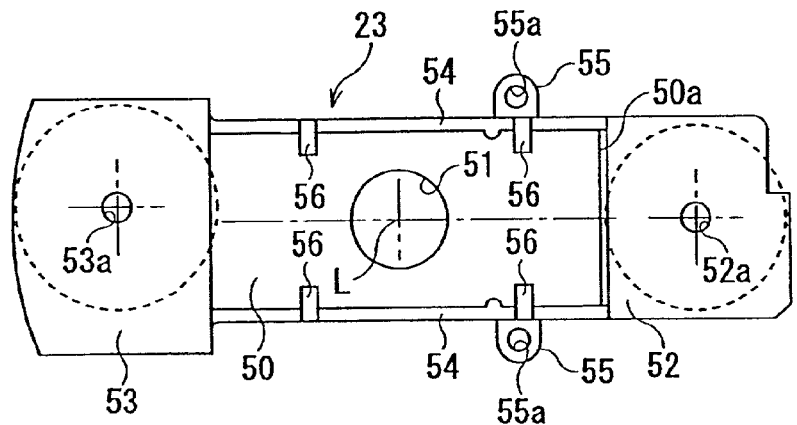
FIG. 4A is a front elevational view of a base plate of the diaphragm device shown in FIGS. 1A and 1B.
Figure 4B:
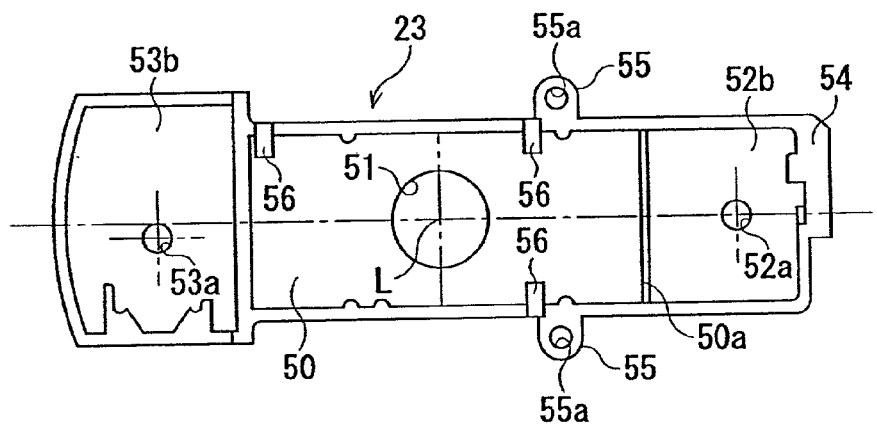
FIG. 4B is a rear elevational view of the base plate shown in FIG. 4A.

The base 23 is provided with a plane portion 50. The pair of blades 30a and 30b which overlap each other lie on a front surface (first surface) of the plane portion 50 so as to be in intimate contact therewith. The first and second galvanometer type actuators 24 and 25 are fixed to the front surface of the plane portion 50. On the other hand, the filter supporting plate 40 is fixed to a rear surface (second surface) of the plane portion 50 so as to be in intimate contact therewith. The plane portion 50 is provided, in the vicinity of substantially the center thereof where the optical axis L lies, with the aforementioned circular aperture 51. The plane portion 50 is provided along an peripheral edge thereof with a frame portion 54 the thickness of which is greater than the remaining portion of the plane portion 50. The frame portion 54 is provided on opposite sides (the upper and lower sides as shown in FIGS. 4A and 4B) thereof with two protrusions 55, respectively, via which the base plate 23 is fixed to a supporting member (not shown) provided in the lens barrel 18. Each protrusion 55 is provided with an through-hole 55a in which a set screw for fixing the base plate 23 to the supporting member is inserted. The plane portion 50 is provided, on the front surface thereof on the frame portion 54, with four supporting protrusions 56 (see FIGS. 4A and 5), and the plane portion 50 is provided, on the rear surface thereof on the frame portion 54, with three supporting protrusions 56 (see FIGS. 4B and 6). The supporting protrusions 56 formed on the front surface of the plane portion 50 guide the pair of blades 30a and 30b slidably in a longitudinal direction (the horizontal direction as viewed in FIG. 4A) of the base plate 23 relative to the base plate 23 while preventing the pair of blades 30a and 30b from disengaging from the front surface of the plane portion 50. Similarly, the supporting protrusions 56 formed on the rear surface of the plane portion 50 guide the filter supporting plate 40 slidably in the same longitudinal direction while preventing the filter supporting plate 40 from disengaging from the rear surface of the plane portion 50.

The base plate 23 is provided on opposite ends (left and right ends as viewed in FIG. 4A) thereof with a first mounting portion 52 and a second mounting portion 53, respectively. The first galvanometer type actuator 24 is fixed to the first mounting portion 52. A circle indicated by a broken line on the first mounting portion 52 in FIG. 4A indicates the fixing position of the first galvanometer type actuator 24 on the first mounting portion 52. On the other hand, the second galvanometer type actuator 25 is fixed to the second mounting portion 53. A circle indicated by a broken line on the second mounting portion 53 in FIG. 4A indicates the fixing position of the second galvanometer type actuator 25 on the second mounting portion 53. The first mounting portion 52 is provided, at the center of the circle indicated thereon in FIG. 4A, with a through-hole 52a in which a rotational shaft 24c (see FIG. 6) of the first galvanometer type actuator 24 is inserted, while the second mounting portion 53 is provided, at the center of the circle indicated thereon in FIG. 4A, with a through-hole 53a in which a rotational shaft 25c (see FIG. 6) of the second galvanometer type actuator 25 is inserted.

Figure 4C:
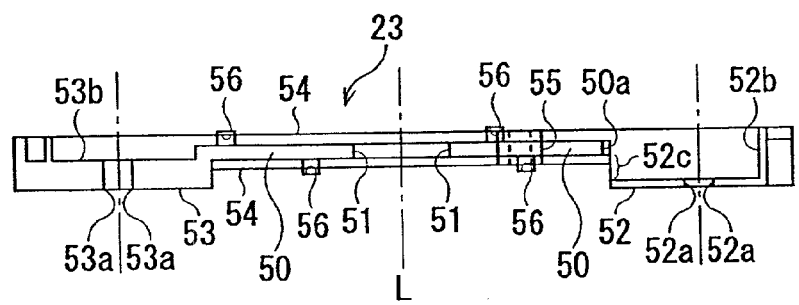
FIG. 4C is a side elevational view of the base plate shown in FIG. 4A.

FIG. 4C shows a side elevational view of the base plate 23. The upper and lower surfaces of the base plate 23, as viewed in FIG. 4C, correspond to the rear and front surfaces of the base plate 23, respectively. As can be seen from FIG. 4C, each of the first and second mounting portions 52 and 53 projects forwards (downward as viewed in FIG. 4A) from the plane portion 50. Furthermore, as can be seen from FIG. 4C, each of the first and second mounting portions 52 and 53 is provided on a rear surface (upper surface as viewed in FIG. 4C) thereof with a recessed portion 52b and 53b formed along the shape of the first and second mounting portion 52 or 53, respectively. The tip of the rotational shaft 24c of the first galvanometer type actuator 24 is inserted in the through aperture 52a to be positioned in the space in the recessed portion 52b, while the tip of the rotational shaft 25c of the second galvanometer type actuator 25 is inserted in the through aperture 53a to be positioned in the space in the recessed portion 53b. Two drive levers 24a and 24b which are connected to the rotational shaft 24c (see FIGS. 6 and 7) and which are respectively engaged with the drive arms 33a and 33b of the first and second blades 30a and 30b are positioned in the recessed portion 52b. A drive lever 25a which is connected to the rotational shaft 25c (see FIGS. 6 and 7) and which is engaged with the drive arm 43 of the filter supporting plate 40 is positioned in the recessed portion 53b.

Figure 7:
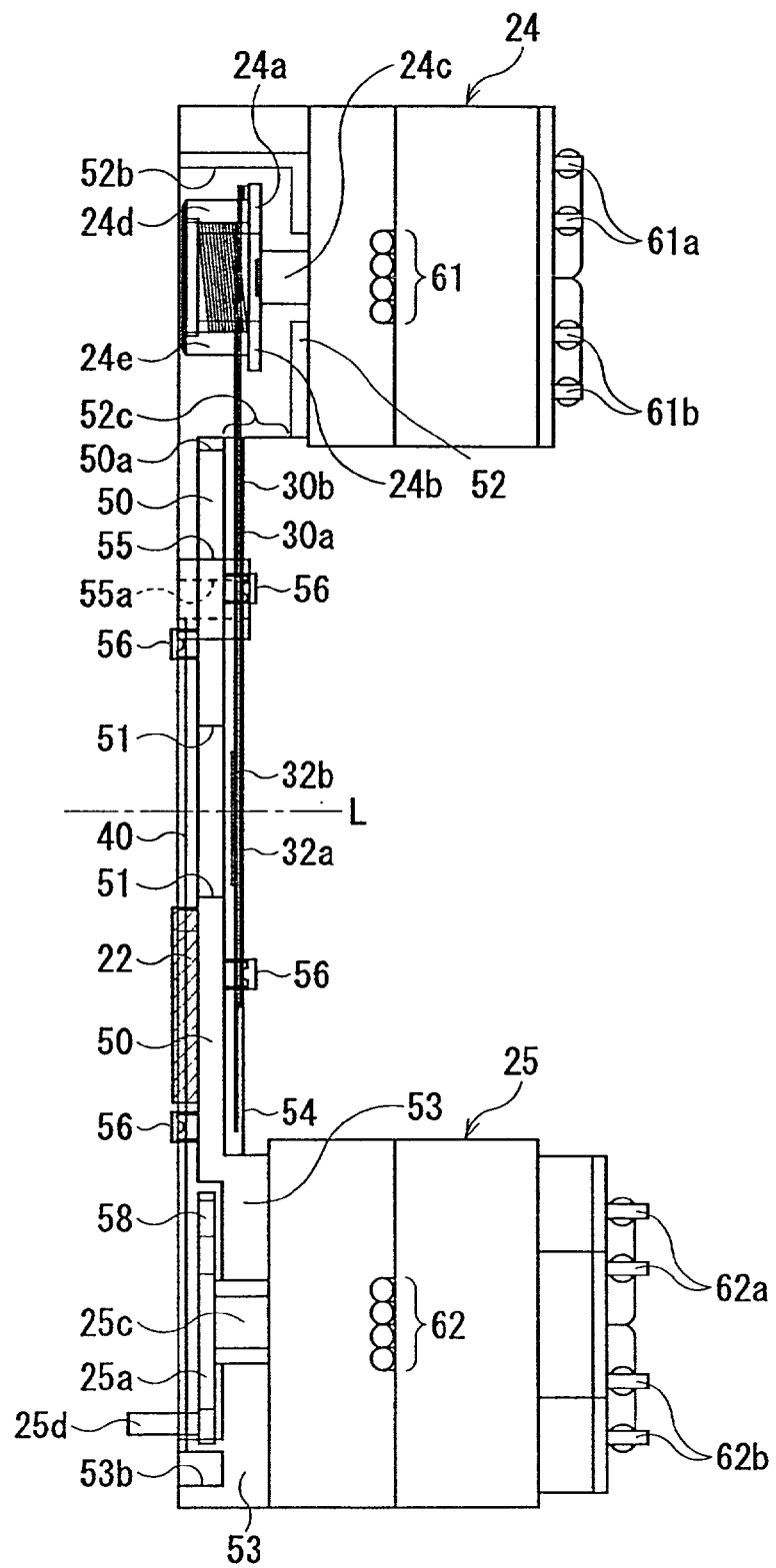
FIG. 7 is a side elevational view of the base plate shown in FIG. 4A with the pair of blades shown in FIGS. 2A and 2B and the filter supporting plate shown in FIG. 3A being attached to the base plate.

The base plate 23 is provided, on a side wall of the first mounting portion 52 on the side of the plane portion 50, with an opening 52c (see FIGS. 4C and 7). The plane portion 50 of the base plate 23 is provided at one end (the right end as viewed in FIG. 4B) thereof with an end surface 50a adjacent to the first mounting portion 52. Accordingly, the space in the recessed portion 52b communicatively connects with the outside space in front of the plane portion 50 via the opening 52c. The drive arms 33a and 33b of the first and second blades 30a and 30b are inserted into the opening 52c to be engaged with the engaging pins 24d and 24e of the drive levers 24a and 24b, which are positioned in the recessed portion 52b, via the slots 34a and 34b of the drive arms 33a and 33b, respectively. On the other hand, the drive arm 34 of the filter supporting plate 40 is engaged with the engaging pin 25d of the drive levers 25a, which is positioned in the recessed portion 53b, via the slot 44 of the drive arm 43.

Figure 5:
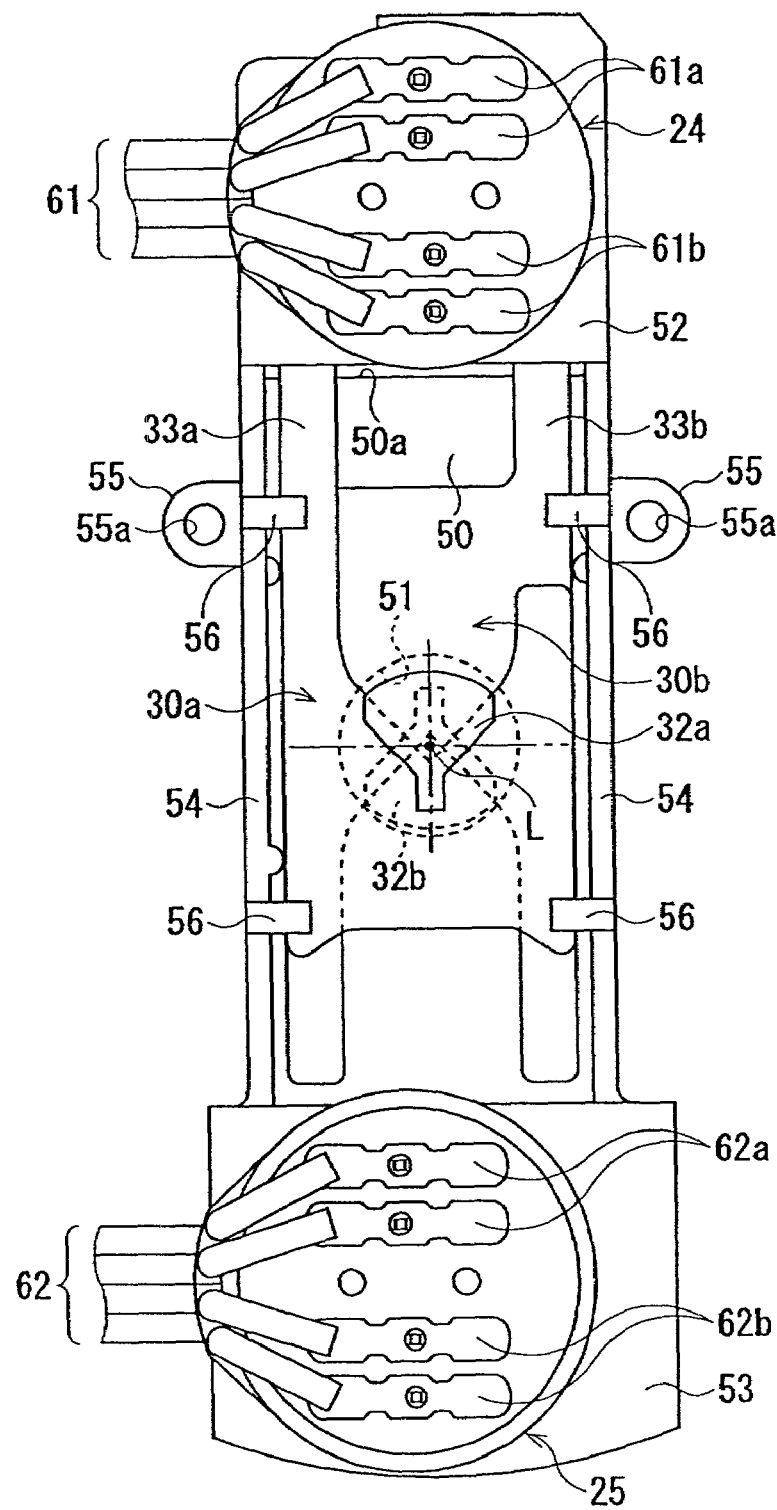
FIG. 5 is a front elevational view of the base plate shown in FIG. 4A with the pair of blades shown in FIGS. 2A and 2B and the filter supporting plate shown in FIG. 3A being attached to the base plate.
Figure 6:
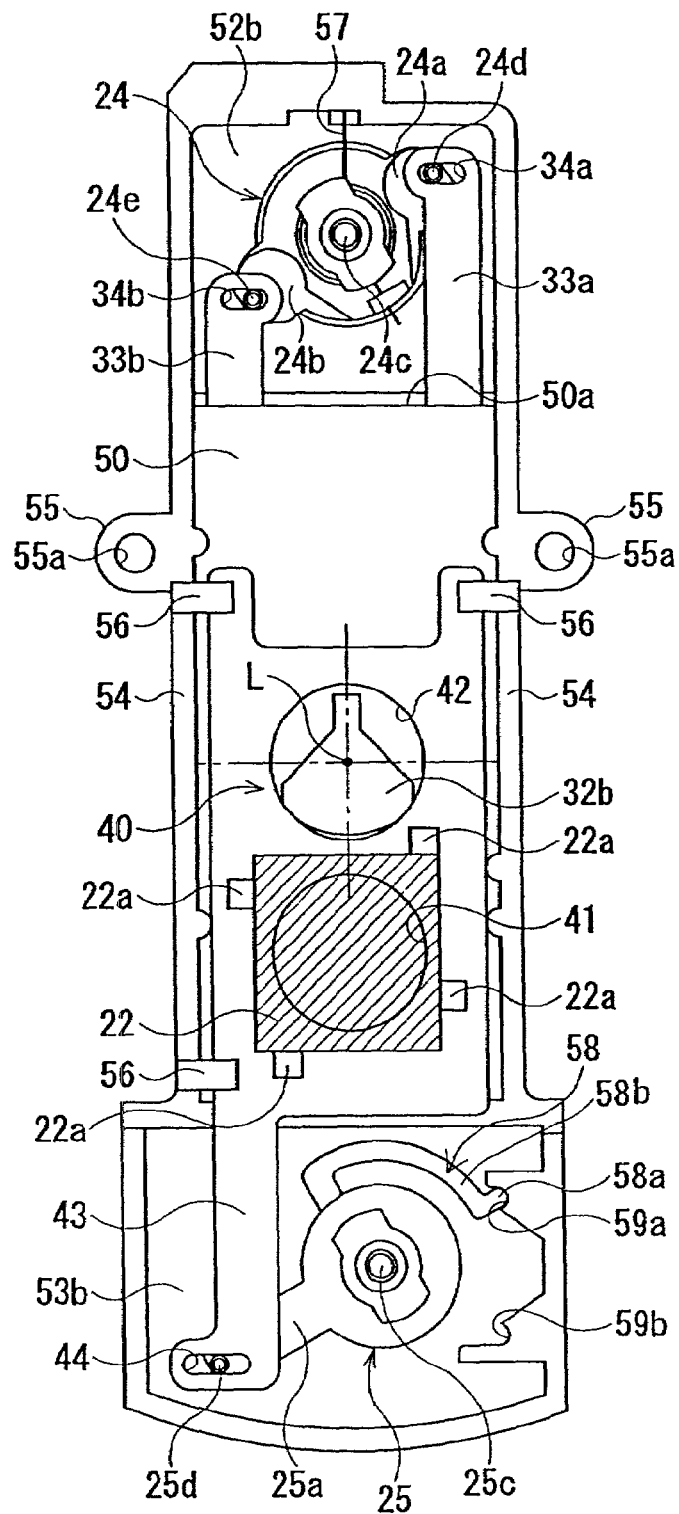
FIG. 6 is a rear elevational view of the base plate shown in FIG. 4A with the pair of blades shown in FIGS. 2A and 2B and the filter supporting plate shown in FIG. 3A being attached to the base plate.

Each of the drive levers 24a and 24b, which are fixed to the rotational shaft 24c of the first galvanometer type actuator 24, is biased counterclockwise, as viewed in FIG. 6, by a torsion coil spring 57. FIGS. 5 and 6 show a state where the first galvanometer type actuator 24 is not actuated. In this state, the drive levers 24a and 24b are acted upon by only the spring force of the torsion coil spring 57, so that the drive levers 24a and 24b are fully turned counterclockwise as viewed in FIG. 6 (clockwise with respect to FIG. 5). In this state, the first blade 30a is positioned so as to be inserted into the first mounting portion 52 by a greater amount, while the second blade 30b is positioned so as to be inserted into the first mounting portion 52 by a less amount. Therefore, the V-shaped portions 31a and 31b of the pair of blades 30a and 30b form an aperture (an optical path) at substantially the center of the circular aperture 51. In this state, the ND filters 32a and 32b overlap each other as shown by broken lines in FIG. 5 to reduce the quantity of light passing the aperture formed by the V-shaped portions 31a and 31b. If each of the ND filters 32a and 32b has the spectral transmittance characteristics indicated by the solid line Y or the broken line Z in FIG. 8, infrared light rays are filtered out.

Actuating the first galvanometer type actuator 24 causes the drive levers 24a and 24b to rotate clockwise as viewed in FIG. 6 (counterclockwise with respect to FIG. 5). The rotation of the drive levers 24a and 24b causes the first blade 30a and the second blade 30b to move away from the first mounting portion 52 and to move toward the first mounting portion 52, respectively (via the drive arms 33a and the 33b), to thereby increase the size of the aperture formed by the V-shaped portions 31a and 31b. At the time the drive levers 24a and 24b are fully rotated clockwise with respect to FIG. 6, the circular aperture 51 is surrounded by the aperture formed by the V-shaped portions 31a and 31b. At this time, both the ND filters 33a and 33b are positioned outside the circular aperture 51, while the aperture of the diaphragm unit 20 is formed by the circular aperture 51, not by the aperture formed by the V-shaped portions 31a and 31b. Accordingly, both the ND filters 33a and 33b are fully retracted from the optical path (the circular aperture 51) of the television camera lens.

On the other hand, in addition to the drive lever 25a, a fixing end of a latch lever 58 is fixed to the rotational shaft 25c. The latch lever 58 is made of a synthetic resin such as Delrin (trade name), and is provided with an arc-shaped arm portion 58b (see FIG. 6). The arm portion 58b is provided at a free end thereof with a protrusion 58a which extends radially outwards in a radial direction with respect to the rotational shaft 25c. The arm portion 58b can bend resiliently to provide a spring force. The arm portion 58b and two latching recesses (first and second latching recesses) 59a and 59b which are formed on the mounting portion 53 in the recess 53b together constitute a latch mechanism (lock mechanism). The protrusion 58a of the arm portion 58b can be engaged in either the first latching recess 59a or the second latching recess 59b. In a state shown in FIG. 6, the protrusion 58a is engaged in the first latching recess 59a, while the drive lever 25a of the second galvanometer type actuator 25 is fully turned counterclockwise as viewed in FIG. 6. Therefore, in a state shown in FIG. 6, the filter supporting plate 40 is held on the second mounting portion 53 side in a position where the center of the circular aperture 42 is coincident with the optical axis L. Accordingly, in a state shown in FIG. 6, the incident light on the objective lens of the lens barrel 18 enters into the camera body 10 via the circular aperture 42.

Actuating the second galvanometer type actuator 25 causes the drive lever 25a to rotate clockwise with respect to FIG. 6. The clockwise rotation of the drive lever 25a causes the protrusion 58a of the latch lever 58 to be firstly disengaged from the first latching recess 59a, and thereafter be engaged in the second latching recess 59b. This position of engagement of the protrusion 58a with the second latching recess 59b corresponds to the fully turned position of the drive lever 25a in a clockwise direction with respect to FIG. 6. This clockwise rotation of the drive lever 25a causes the filter supporting plate 40 to move toward the first mounting portion 52, and consequently, the filter supporting plate 40 is held on the first mounting portion 52 side in a position where the center of the circular aperture 41 is coincident with the optical axis L. Accordingly, in this state the incident light on the objective lens of the lens barrel 18 enters into the camera body 10 via the infrared absorbing filter 22 which covers the circular aperture 41.

As can be understood from the above description, the infrared absorbing filter 22 is inserted into and retracted from the television camera lens optical path in the lens barrel 18 by rotating the second galvanometer type actuator 25 clockwise and counterclockwise, respectively.

As shown in FIG. 6, the first galvanometer type actuator 24 is provided with two pairs of electrode terminals 61a and 61b, and the second galvanometer type actuator 25 is provided with two pairs of electrode terminals 62a and 62b. One pair of electrode terminals 61a of the first galvanometer type actuator 24 are used to supply power to the first galvanometer type actuator 24, and one pair of electrode terminals 62a of the second galvanometer type actuator 25 are used to supply power to the second galvanometer type actuator 25. The other pair of electrode terminals 61b of the first galvanometer type actuator 24 are electrically connected to, e.g., a generator (not shown) which is positioned in the first galvanometer type actuator 24 to detect the rotational speed of the rotational shaft 24c, while the other pair of electrode terminals 62b of the second galvanometer type actuator 25 are electrically connected to, e.g., a generator (not shown) which is positioned in the second galvanometer type actuator 25 to detect the rotational speed of the rotational shaft 25c. Two groups of wires 61 and 62 which are respectively connected at one ends thereof to the two pairs of electrode terminals 61a and 61b are connected at the other ends thereof with a control circuit (not shown), or the like.

As can be understood from the above description, according to the present embodiment of the diaphragm device, parts and mechanisms associated with the infrared absorbing filter 22 can be miniaturized since the mechanism for inserting and retracting the infrared absorbing filter 22 into and from a optical path of a television camera lens and the diaphragm mechanism which includes the pair of blades 30a and 30b are formed as a unit. Consequently, a mechanism for driving the infrared absorbing filter 22 can be disposed in the lens barrel 18. Namely, such a mechanism does not have to be disposed in the camera body 10, so that the inner space in the CCTV surveillance camera 1 can be used with efficiency to miniaturize the CCTV surveillance camera 1.

Although it is possible that the base plate 23 be provided on the front surface thereof with a cover plate for supporting the pair of blades 30a and 30b between the cover plate and the front surface of the base plate 23, and that the base plate 23 be provided on the rear surface thereof with another cover plate for supporting the filter supporting plate 40 between the cover plate and the rear surface of the base plate 23, it is preferable that the base plate 23 be provided on the front surface of the plane portion 50 with the four supporting protrusions 56 and that the base plate 23 be provided on the rear surface of the plane portion 50 with the three supporting protrusions 56, as described above, in order to decrease the thickness of the diaphragm device, and at the same time, to reduce the cost of production.

Although the infrared absorbing filter 22 is fixed to the filter supporting plate 40 in the above described embodiment of the CCTV surveillance camera 1, any other type of filter can be fixed to the filter supporting plate 40 in accordance with the use of the CCTV surveillance camera 1. Likewise, although the ND filters 32a and 32b having the spectral transmittance characteristics indicated by the lines Y and Z in FIG. 9 are fixed to the pair of blades 30a and 30b in the above described embodiment of the CCTV surveillance camera 1, respectively, any other type filter can be fixed to each of the pair of blades 30a and 30b, or no filter can be fixed to each of the pair of blades 30a and 30b in accordance with the use of the CCTV surveillance camera 1.

Figure 9A:
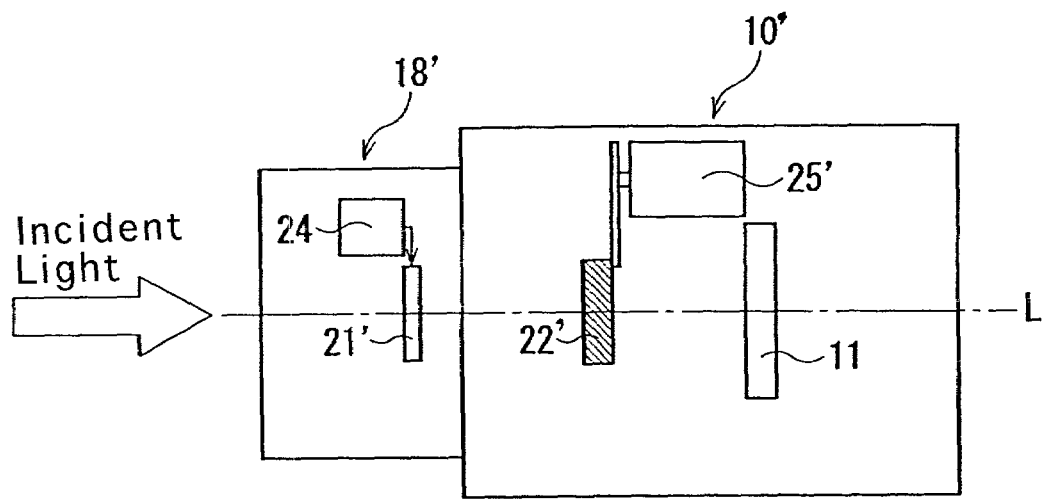
FIG. 9A is a view similar to that of FIG. 1A and shows fundamental elements of a conventional CCTV surveillance camera.
Figure 9B:
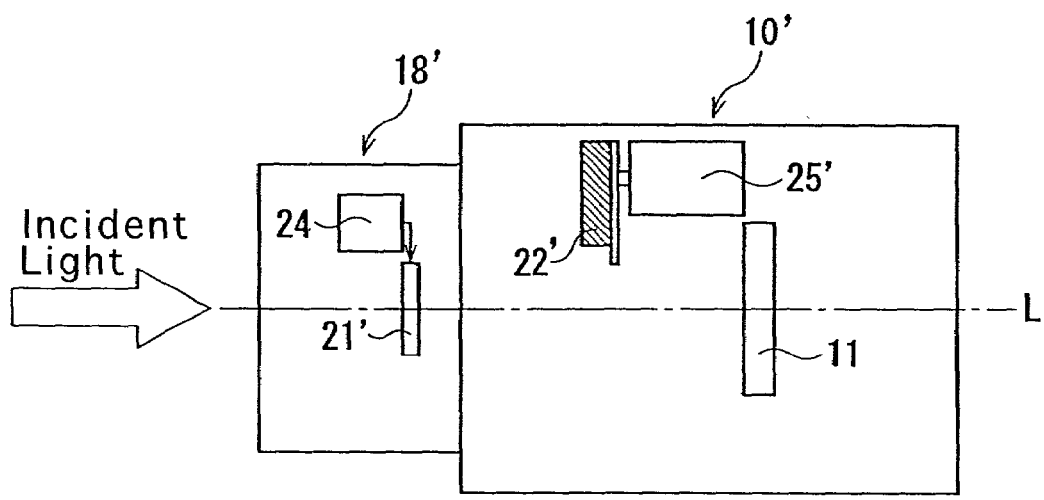
FIG. 9B is a view similar to that of FIG. 1B and shows the fundamental elements of the conventional CCTV surveillance camera shown in FIG. 9A.

However, according to the CCTV surveillance camera 1 of the present invention, by providing the filter supporting plate 40 with the infrared absorbing filter 22 having the spectral transmittance characteristics indicated by the lines X shown in FIG. 9, and further providing the pair of blades 30a and 30b with the ND filters 32a and 32b having the spectral transmittance characteristic indicated by the lines Y and Z in FIG. 9, respectively, in a manner such as described above, makes it possible to take color images in the daytime and monochrome images at nighttime advantageously.

The configuration of the television camera lens elements provided in the lens barrel 18 does not limit the scope of the present invention. Formerly, a lens system whose various aberrations are corrected chiefly for the visible light region is used as a television camera lens system of a CCTV surveillance camera, while a plan-parallel plate having a predetermined thickness is inserted into a television camera lens optical path (instead of an infrared absorbing filter) during an image-forming operation for the near-infrared region at nighttime to correct the focal point. However, in recent years, a lens system whose various aberrations are corrected within tolerance of a shift of the focal point in an image-forming operation between the daytime and the nighttime has been proposed.

The present invention can be applied to either type lens system which needs a plane-parallel plate. In the case where the plan-parallel plate is used, the plan-parallel plate 22X can be fixed to the aperture 42 of the filter supporting plate 40 as shown in FIG. 3B. If the plane-parallel plate is used in a lens system whose various aberrations are corrected within tolerance of a shift of the focal point in an image-forming operation between the daytime and the nighttime, an optical thickness (=refractive index×actual thickness) of the plane-parallel plate 22X is preferably identical to that of an infrared absorbing filter 22 fixed to the aperture 41 of the filter supporting plate 40.

Although the pair of blades 30a and 30b and the filter supporting plate 40 are respectively driven by the first and second galvanometer type actuators 24 and 25 in the above described embodiment of the CCTV surveillance camera 1, the pair of blades 30a and 30b and the filter supporting plate 40 can be driven by another kind of actuator. However, galvanometer type actuators are the most suitable for use in miniaturization of the system. Furthermore, the galvanometer type actuators are more durable than motors, and simplify the circuitry of the system, which in turn reduces the cost of production.

Although each of the first and second galvanometer type actuators 24 and 25 in the above described embodiment is provided with a generator to detect the rotational speed of the rotational shaft 24c or 25c, the second galvanometer type actuator, which is used for driving the infrared absorbing filter 22, does not have to be provided with such a generator.

Although the lens barrel 18 and the camera body 10 of the CCTV surveillance camera 1 in the above described embodiment are integrally fixed to each other, the CCTV surveillance camera 1 can be of a type wherein the lens barrel 18 is disconnectable from the camera body 10.

As can be understood from the foregoing, according to the present invention, a compact diaphragm device of a television camera lens for a CCTV surveillance camera is achieved, wherein the drive mechanisms for a diaphragm and an optical filter are positioned in the lens barrel of the television camera.

Since the diaphragm device includes a filter supporting plate (40) having two apertures (41 and 42); wherein the diaphragm has a pair of blades (30a and 30b) which overlap each other and lie on a first surface of the base plate, the filter supporting plate lying on a second surface of the base plate, and since the filter driver moves the filter supporting plate so that the two apertures are selectively positioned in the optical path, the diaphragm device can be made slimmer and more compact.

Since the filter driver includes a latch mechanism (58b, 59a and 59b) which latches the optical filter/filter supporting plate at an advanced position and at a retracted position when the filter driver moves the optical filter into and out of the optical path, respectively, the power consumption of the filter drive device can be reduced since the position of the optical filter is maintained by the latch mechanism at all times other than when the filter drive device is in operation to move the optical filter into or out of the optical path of the television camera lens optical system.

Since the ND filter has spectral transmittance characteristics such that a transmittance of the ND filter for light in an infrared region is substantially identical to or less than a transmittance of the ND filter for visible light, the amount of light transmission can be controlled without deteriorating the chromatic characteristics of a color image during color-image taking in the daytime, while all the amount of light transmission including visible light and infrared light can be controlled to a sufficient degree during monochromatic image-forming at nighttime. This prevents a phenomenon from occurring in which a portion of an object, which has a high reflectivity for infrared light, appears too bright.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A diaphragm device of a lens for a CCTV camera, comprising:
    a lens barrel;
    a diaphragm;
    a base plate which supports said diaphragm;
    a diaphragm driver for driving said diaphragm to adjust a size of an aperture formed by said diaphragm;
    an optical filter; and
    a filter driver for moving said optical filter into and out of an optical path of said lens;
    wherein said diaphragm is provided on a first side of said base plate and said optical filter is provided on a second side of said base plate which is opposite to said first side of said base plate;
    wherein said diaphragm is driven by said diaphragm driver independently of the moving of said optical filter by said filter driver; and
    wherein said diaphragm, said base plate, said diaphragm driver, said optical filter, and said filter driver are provided in said lens barrel.

2. The diaphragm device according to claim 1, further comprising:
    a filter supporting plate having two apertures, said optical filter being fixed to said filter supporting plate so as to cover at least one of said two apertures;
    wherein said diaphragm comprises a pair of blades which overlap each other;
    wherein said pair of blades lie on a first surface of said base plate;
    wherein said filter supporting plate lies on a second surface of said base plate; and
    wherein said filter driver moves said filter supporting plate so that said two apertures are selectively positioned in said optical path.

3. The diaphragm device according to claim 2, wherein said base plate comprises a plurality of supporting protrusions which are formed on each of front and rear surfaces thereof to support and guide each of said diaphragm and said filter supporting plate in a longitudinal direction of said base plate.

4. The diaphragm device according to claim 2, wherein said filter driver comprises a latch mechanism which positions said filter supporting plate at an advanced position and a retracted position when said filter driver moves said optical filter into and out of said optical path, respectively.

5. The diaphragm device according to claim 2, further comprising:
    at least one second optical filter which is fixed to at least one of said pair of blades so as to cover said aperture formed by said pair of blades of said diaphragm.

6. The diaphragm device according to claim 5, wherein each of said at least one second optical filter comprises an ND filter.

7. The diaphragm device according to claim 6, wherein said ND filter comprises spectral transmittance characteristics wherein a transmittance of said ND filter for light in an infrared region is one of substantially identical to and less than a transmittance of said ND filter for visible light.

8. The diaphragm device according to claim 6, wherein said ND filter comprises spectral transmittance characteristics so as to filter out light in an infrared region.

9. The diaphragm device according to claim 6, wherein a surface of said ND filter has a reflectivity which is one of equal to and less than approximately two percent.

10. The diaphragm device according to claim 6, wherein said ND filter is made of a resin base on which multi-metal layers are formed by evaporating a metal onto said resin base.

11. The diaphragm device according to claim 7, wherein said infrared region ranges from approximately 700 to 1000 nanometers.

12. The diaphragm device according to claim 8, wherein said infrared region ranges from approximately 700 to 1000 nanometers.

13. The diaphragm device according to claim 1, wherein said filter driver comprises a lock mechanism which locks said optical filter at an advanced position and a retracted position when said filter driver moves said optical filter into and out of said optical path, respectively.

14. The diaphragm device according to claim 1, wherein said lens barrel is integrally fixed to a camera body of said CCTV surveillance camera.

15. The diaphragm device according to claim 1, wherein said diaphragm driver comprises a galvanometer type actuator.

16. The diaphragm device according to claim 1, wherein said filter driver comprises a galvanometer type actuator.

17. A diaphragm unit provided in a lens barrel of a CCTV surveillance camera, comprising:
    a base plate having a plane portion on which an image-forming aperture is formed;
    a filter supporting plate which is held by one of front and rear surfaces of said base plate to be movably guided on and along said one of said front and rear surfaces, said filter supporting plate having two apertures which are selectively positioned to align with said image-forming aperture;
    an infrared absorbing filter fixed to said filter supporting plate so as to cover one of said two apertures;
    a pair of diaphragm blades which slidably overlap each other and are held by the other of said front and rear surfaces of said base plate, wherein a variable-sized aperture is formed by said pair of diaphragm blades, the size of said variable-size aperture changing in accordance with relative movement between said pair of diaphragm blades;
    at least one ND filter which is fixed to at least one of said pair of diaphragm blades so as to cover said image-taking aperture; and
    first and second actuators fixed to said base plate on opposite sides of said plane portion of said base plate, respectively;
    wherein said first actuator moves said pair of diaphragm blades in opposite directions relative to each other to adjust said size of said variable-sized aperture; and
    wherein said second actuator moves said filter supporting plate so that said two apertures are selectively positioned to align with said image-forming aperture.

18. The diaphragm unit according to claim 17, wherein said ND filter comprises spectral transmittance characteristics wherein a transmittance of said ND filter for light in an infrared region is one of substantially identical to and less than a transmittance of said ND filter for visible light.

19. The diaphragm unit according to claim 17, wherein said ND filter comprises spectral transmittance characteristics so as to filter out light in an infrared region.

20. The diaphragm unit according to claim 17, further comprising:
    a plane-parallel plate which is fixed to said filter supporting plate so as to cover the other of said two apertures, wherein said second actuator moves said filter supporting plate so that said infrared absorbing filter is positioned in front of a color image pick-up device of said CCTV surveillance camera during an image-forming operation in the daytime, and so that said plane-parallel plate is positioned in front of said color-image pick-up device of said CCTV surveillance camera during an image-forming operation at nighttime.

21. The diaphragm unit according to claim 17, further comprising:
a latch mechanism which positions said filter supporting plate in each of first and second positions;
wherein one of said two apertures is positioned to align with said image-forming aperture when said filter supporting plate is positioned in said first position, and
wherein the other of said two apertures is positioned to align with said image-forming aperture when said filter supporting plate is positioned in said second position.

22. The diaphragm unit according to claim 18, wherein said infrared region ranges from approximately 700 to 1000 nanometers.

23. The diaphragm unit according to claim 17, wherein a surface of said ND filter has a reflectivity which is one of equal to and less than approximately two percent.

24. The diaphragm unit according to claim 17, wherein said ND filter is made of a resin base on which multi-metal layers are formed by evaporating a metal onto said resin base.

25. A diaphragm device, comprising:
a plurality of diaphragm blades which slidably overlap each other to form a variable-sized aperture;
a filter supporting plate having an infrared absorbing filter;
a base plate which supports said plurality of diaphragm blades and said filter supporting plate on opposite surfaces of said base plate, respectively;
a first driver for moving said plurality of diaphragm blades on said base plate to adjust a size of said variable-sized aperture; and
a second driver for moving said filter supporting plate on said base plate so that said infrared absorbing filter is selectively inserted into and retracted from an optical path in said lens barrel;
wherein said first driver and said second driver are positioned on opposite sides of said base plate.

* * * * *